March 19, 1940.                M. KLAVÍK                2,194,398
       VENTILATION OF THE MOTOR COMPARTMENT IN STREAMLINED AUTOMOBILES
                         Filed Feb. 28, 1939
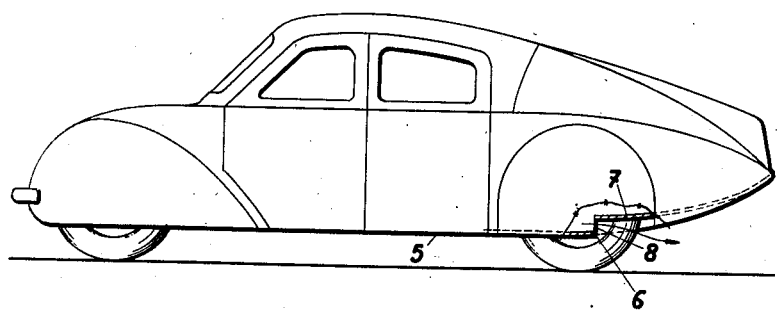

Patented Mar. 19, 1940

2,194,398

UNITED STATES PATENT OFFICE 2,194,398

VENTILATION OF THE MOTOR COMPARTMENT IN STREAMLINED AUTOMOBILES

Miloš Klavík, Prague-Smichov, Czechoslovakia

Application February 28, 1939, Serial No. 259,047
In Czechoslovakia January 17, 1938

1 Claim. (Cl. 180—54)

In automobiles with stream-lined bodies, the ventilation of the motor compartment is effected through apertures provided in the bottom surface of the body as the visible external surfaces of the body should have the smoothest possible form. As, however, no vacuum is produced under said bottom surface while the automobile is travelling, the air has to be forced out of these apertures at the expense of motor power.

This disadvantage is eliminated according to the invention by constructing the bottom surface of the body not as a continuous surface parallel to the road surface but as two parallel surfaces which are separated from one another by a step-shaped portion, into which the ventilation apertures of the motor compartment open. While the automobile is travelling, a vacuum is produced behind the step, thereby substantially assisting the flow of air through the motor compartment and the escape of the heated air outwardly from the motor compartment.

The figure shows the arrangement of the ventilation in an automobile with rear engine.

In the construction according to the illustration shown in the drawing, the bottom surface 5 of the body terminates at the step 6, behind which the parallel surface extends under the rearward motor compartment.

An aperture 8 is provided in the step 6, through which aperture the heated air escapes and is aspirated from the motor compartment, this being assisted by the vacuum produced behind the said step while the automobile is travelling.

I claim:

In an automobile having a bottom portion substantially parallel with the road and a motor compartment at the rear, means for ventilating the motor compartment comprising a partly raised bottom for the motor compartment, a step-like portion joining the bottom portions of the motor compartment and means for allowing heated air to escape from the motor compartment, provided in the step-like portion.

MILOŠ KLAVÍK.